United States Patent [19]

Karaba et al.

[11] 4,079,707

[45] Mar. 21, 1978

[54] VARIABLE COMPRESSION RATIO PISTON

[75] Inventors: Albert M. Karaba, Muskegon; Alexander P. Brouwers, Bloomfield Hills; Walter F. Isley, Grosse Pointe Farms, all of Mich.

[73] Assignee: Teledyne Industries, Inc., Los Angeles, Calif.

[21] Appl. No.: 706,586

[22] Filed: Jul. 19, 1976

[51] Int. Cl.² .......................................... F02B 75/04
[52] U.S. Cl. .................................. 123/78 B; 92/60.5; 123/48 B
[58] Field of Search ............... 123/48 B, 78 B; 92/82, 92/60.5

[56] References Cited

U.S. PATENT DOCUMENTS

| | | | |
|---|---|---|---|
| 1,825,163 | 9/1931 | Schweter | 123/78 B |
| 2,742,027 | 4/1956 | Mansfield | 123/78 B |
| 3,200,798 | 8/1965 | Mansfield | 123/78 B |
| 3,450,113 | 6/1969 | Bachle | 123/78 B |
| 3,527,264 | 9/1970 | Bachle | 123/78 B |

Primary Examiner—Charles J. Myhre
Assistant Examiner—David D. Reynolds

Attorney, Agent, or Firm—Gifford, Chandler, Sheridan & Sprinkle

[57] ABSTRACT

A two part variable compression ratio (VCR) piston assembly for use in a two cycle internal combustion engine, the piston assembly including an outer member movable relative to an inner member to vary the compression ratio of the engine and a hydraulic system utilizing oil from the lubrication system of the engine to automatically control the relative movement of the members to maintain a predetermined maximum combustion chamber pressure. The hydraulic circuit includes an upper and a lower chamber which expands and contracts conversely upon relative movement of the piston members and further includes a pumping system for pumping oil to the upper chamber and to the lower chamber through the upper chamber to thereby vary the compression ratio of the piston. The lower chamber is disposed adjacent the piston ring area of the piston assembly and the hydraulic system includes a pressure responsive release valve to discharge oil from the upper chamber to the crankcase of the engine upon a predetermined pressure being produced in the upper chamber.

11 Claims, 2 Drawing Figures

VARIABLE COMPRESSION RATIO PISTON

BACKGROUND OF THE INVENTION

I. Field of the Invention

The present invention relates to a variable compression ratio (VCR) piston assembly and, more particularly, to such an assembly for a two stroke internal combustion engine.

II. Description of the Prior Art

The previously known VCR piston assemblies typically comprise an inner piston member connected in the usual manner to a connecting rod and an outer piston member carried by and axially movable relative to the inner member. Relative movement of these members varies the compression ratio of the particular cylinder in which the piston moves. Clearance spaces are provided between the top and bottom ends of the inner and outer members and these form upper and lower chambers which vary conversely in volume in relation to the relative movement of the piston members. An incompressible fluid, such as the engine lubrication oil, is supplied to these chambers in a manner which automatically regulates movement of the members to gradually change the compression ratio until a predetermined combustion pressure has been achieved. The hydraulic system then varies the movement of the members in a manner which tends to maintain a uniform maximum combustion chamber pressure.

These previously known VCR piston assemblies have been designed for four cycle engine operation. With a four cycle engine, due to inertia forces the outer member of the piston is caused to move away from the inner member at the upper end of the exhaust stroke and at the early part of the downward intake stroke. As the outer member moves relative to the inner piston member, the upper chamber of the piston assembly fills with oil in preparation for the subsequent combustion stroke of the engine. During the combustion stroke of the VCR piston assembly, the oil is expelled from the upper chamber past a pressure responsive release valve and into the oil collection system for the engine.

While these previously known VCR piston assemblies have proven adequate in operation for four stroke engines, such VCR piston assemblies are inoperable with two cycle engines. With a two cycle engine, the exhaust stroke present in a four cycle engine is omitted so that the outer piston member is unable to adequately axially move away from the inner piston member in preparation for the combustion stroke of the engine.

SUMMARY OF THE PRESENT INVENTION

The present invention provides a lightweight, inexpensive VCR piston which is particularly adapted for a two cycle engine operation.

The VCR piston of the present invention comprises an outer member and an inner member. A plate is attached to the top of the inner member and forms a supply valve passage, a discharge valve passage and the lower boundary of the upper chamber. Oil is pumped through the supply valve passage and through a supply valve carried therein directly to the upper chamber by a novel pumping system carried within the inner piston member. The pumping system effects the necessary movement of the outer piston member away from the inner member for a two cycle engine.

The pumping system comprises a plunger slidably mounted in a substantially axially extending bore formed within the inner piston member. The base of the bore is fluidly coupled both to the supply valve and to the oil supply system of the engine through a one way check valve. Thus, as the plunger moves upwardly in the bore, as would occur from inertia during the combustion stroke of the engine, oil is drawn into the base of the bore through the check valve communicating with the engine oil lubrication system. As the plunger moves downwardly in the bore, as would occur at the bottom of the piston stroke, the plunger pumps the oil within the bore through the supply passage, supply valve and into the upper chamber in the VCR piston assembly thereby separating the outer piston member from the inner piston member.

A discharge valve is carried within a passage formed in the plate and comprises a tapered washer which deflects under pressure during the combustion cycle as the piston moves toward its upper travel limit to snap from a closed position to an open position. The discharge valve opens the upper chamber to the crankcase of the engine and thus regulates and prevents excess oil pressure in the upper chamber. The discharge valve opens at a preset oil pressure permitting the volume of the upper chamber to decrease thereby reducing the gas pressure within the combustion chamber of the cylinder.

A lower oil chamber is formed in the ring groove area of the piston by the plate, the inner piston member and a retaining ring mounted to the lower inside surface of the outer member. The lower chamber receives oil directly from the upper chamber through a passage formed in the plate. The oil pressure in the lower chamber offsets the inertia force of the outer member and the passage between the chambers is of a sufficiently small cross sectional area to limit excessive piston travel per stroke which could result in cavitation and unstable engine operation.

DESCRIPTION OF THE DRAWINGS

A better understanding of the present invention will be had upon reference to the following detailed description when read in conjunction with the accompanying drawing wherein like reference characters refer to like parts throughout the several views and in which.

DETAILED DESCRIPTION OF THE INVENTION

Figure 1:
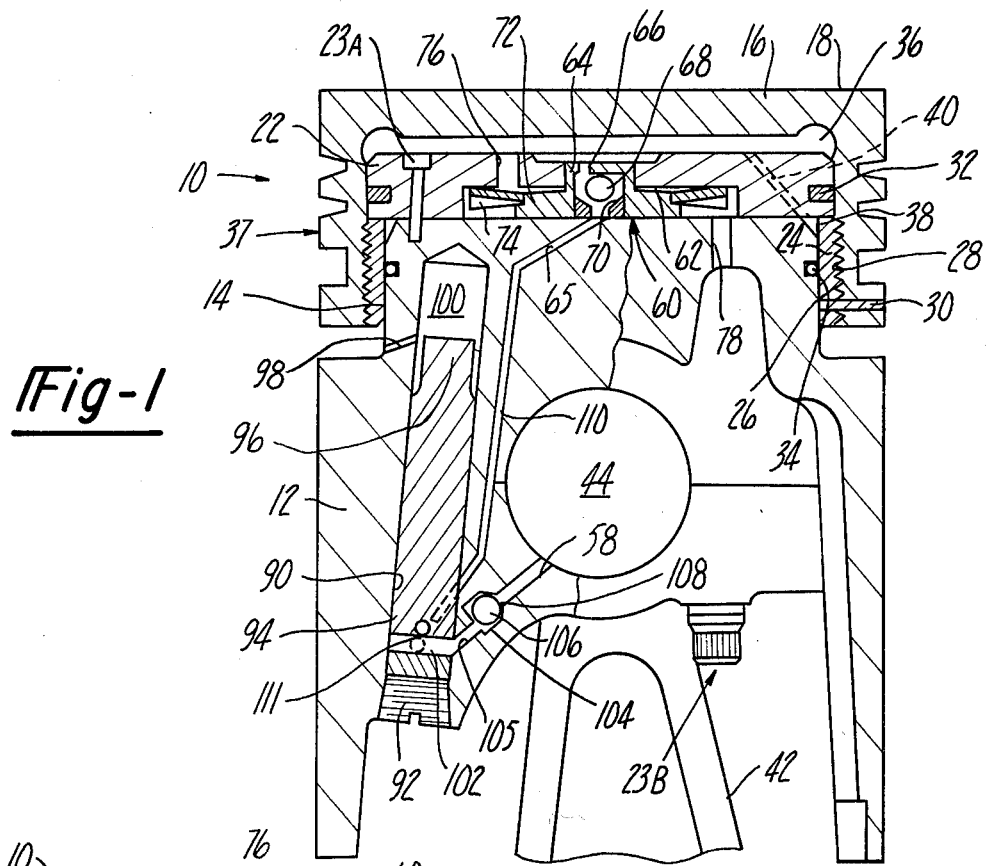
FIG. 1 is a fragmentary longitudinal cross sectional view of a VCR piston assembly employing a preferred construction of the present invention and illustrating the assembly in one operational position.

With reference to the drawing a preferred two stroke variable compression ratio (VCR) piston 10 is there illustrated as comprising an inner member 12 having a radially reduced upper portion 14. An outer piston member 16 is mounted to the outer surface of the reduced portion 14.

The outer member 16 has a crown 18 which serves as the head of the piston 10 and which is compatible with the selected combustion system. The crown 18 forms a movable wall of the lower boundary of the combustion chamber of the engine (not shown). The outer member 16 is axially slideably mounted to the outer surface of the section 14 of the inner member 12.

In the illustrated construction a plate 22 is mounted to the top of the inner member 12 preferably by bolts 23A and 23B and a ring 24 having external threads 26 is mounted to the outer member 16 by threads 28 formed on the inside surface of the lower portion of the outer member 16, the threaded joint formed between the ring 24 and the outer member and 16 being only one preferred method of attachment. The bolts 23A and 23B are alternate methods of fastening the plate 22 to the top of the inner member 12 and only one of these alternate forms need be used. A lock and travel limiting means, such as a lock pin 30, prevents rotation of the ring 24 relative to the piston outer member 16 and, therefore, axial travel of the ring 24. There are, of course, other suitable means which have not been shown for limiting travel of the ring 24. A seal 32 carried by the plate 22 and a seal 34 carried by the reduced portion 14 of the inner member 12 engages the ring 24 to provide a fluid seal between the piston members in the area of the sliding contact.

An upper chamber 36 is formed between the plate 22 and the inside surface of the crown 18 and a lower annular chamber 38 is formed between the lower edge of the plate 22, the outer member 16 and the ring 24 closely adjacent the ring groove area 37 of the piston 10. The sealing ring 34 prevents oil leakage from the lower chamber 38 except through a passage 40 which is formed through the plate 22 and connects the upper chamber 36 to the lower chamber 38. The passage 40 provides fluid transfer between the upper chambers 36 and the lower chamber 38 and is not biased to provide a different orifice coefficient between these chambers as is provided in some previous construction.

The inner member 12 is connected to a connecting rod 42 by a piston pin 44 in the conventional manner of connecting an engine piston to a connecting rod. A passage 58 in the inner piston member 12 communicates with the lubrication system of the engine through the connecting rod 42 by means not shown.

A valve assembly 60 which is carried in a cavity 62 of the plate 22 or in the inner member 12 (not shown) communicates and is disposed between upper chamber 36 and an oil passage 65. The valve assembly 60 is constructed so as to permit the passage of oil from the passage 65 through the valve assembly 60 to the chamber 36. In the construction of the valve assembly 60 as shown, a ball 68 is carried within the tubular portion 64 and is normally positioned on a seat 70 to block fluid flow from the chamber 36 through the passage 66 to the passage 65 but is movable under pressure and inertia to a position to provide an opening for fluid flow from the passage 65 through the passage 66 to the chamber 56.

A radially extending central portion 72 of the valve assembly 60 provides a means for carrying a tapered washer of Belleville spring type discharge valve 74 which in its closed position blocks fluid flow from a passage 76 connected through the plate 22 to the upper chamber 36 to a passage 78 formed through the inner member and open at its lower end to the crankcase (not shown) of the engine.

A substantially axially extending cylindrical bore 90 is formed within the inner member 12 of the piston assembly 10 and is closed at its lowermost end by any conventional means such as a threaded plug 92. A plunger 94 preferably constructed of a high density material and having an upper reduced diameter portion 96 is slidably disposed within the recess 90 and is movable between an upper or outer position illustrated in FIG. 2 and a lower or inner position illustrated in FIG. 1.

A leak passage 98 is provided between the upper end of the bore 90 and the outer periphery of the inner member 12. The leak passage 98 permits oil and crankcase gases entrapped within an upper chamber 100 of the bore 90 to discharge from the chamber 100 past the reduced diameter portion 96 of the plunger 94 to the cylinder walls as long as the large diameter portion of the plunger 94 does not block the passage 98.

A cylindrical chamber 102 is formed in the lower portion of the bore 90 between the plug 92 and the inner end of the plunger 94. The passage 58 fluidly communicates with the chamber 102 through a one way check valve 104 and passage 105. Preferably the check valve assembly 104 comprises a ball 106 which normally sits on a seat 108 to prevent fluid flow from the chamber 102 into the passage 58 but which opens to permit fluid to flow from the passage 58 and into the chamber 102.

A second supply passage 110 intersects the first supply passage 65 at its upper end and is connected to the chamber 102 by a port 111 at its lower end. Thus, the chamber 102 fluidly communicates with the upper chamber 36 via the port 111, passageways 110 and 65, and the valve assembly 60.

As thus far described, it is apparent that the inner member 12 being connected to the connecting rod 42 in the conventional manner moves up and down within the cylinder of an internal combustion engine within fixed limits and in the manner of a conventional piston. The outer member 16 reciprocates within the cylinder within the axial limits defined at its lower limits by the crown 18 engaging the top of the plate 22 and at its upper limit by the top of the ring 34 engaging the lower edge of the plate 22.

Figure 2:
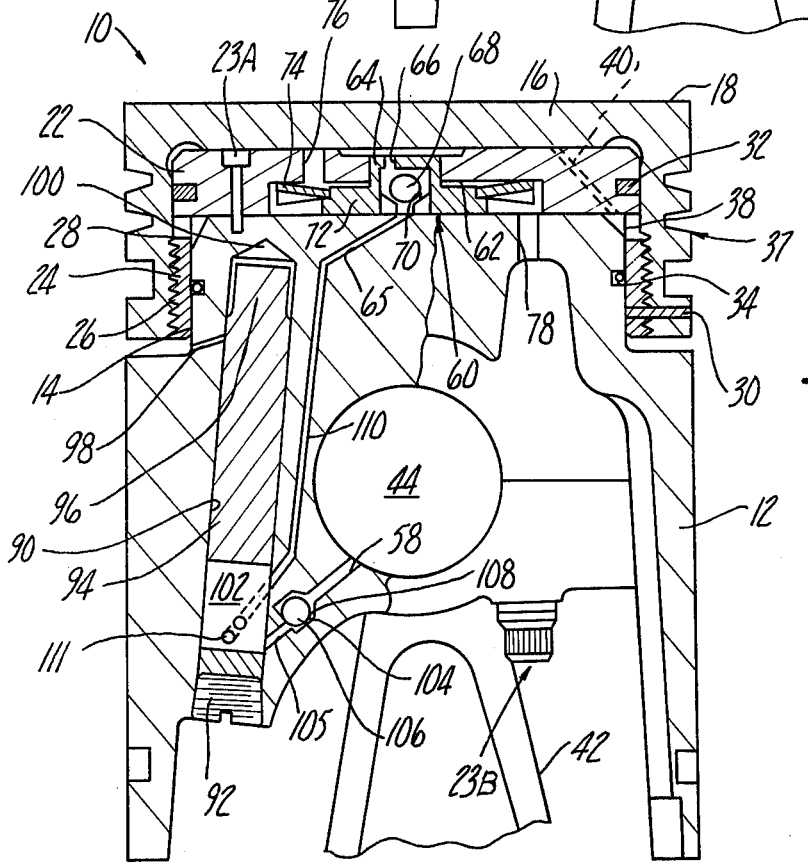
FIG. 2 is a view similar to FIG. 1 but illustrating the VCR piston assembly in another operational position.

Assuming that the outer piston member 16 is separated from the inner member 12 (in a manner which will be shortly described in detail) as the piston assembly 10 approaches its most extended position within the cylinder of the internal combustion engine, the plunger 94 shifts axially upwardly within the bore 90 due to the inertia of the plunger 94 as shown in FIG. 2. This movement of the plunger 94 increases the volume of the chamber 102 and draws oil from the oil lubrication system of the engine through the passage 58, the check valve 104 and into the chamber 102. Oil flow through the supply passages 65 and 110 is prohibited since the valve 60 is closed. Simultaneously the large diameter portion of the plunger 94 covers the leak passageway 98 such that the relatively small amount of oil and crankcase products entrapped within the chamber 100 acts as a cushion for the rising plunger 94. The leak passage 98, however, prevents a build up of excess oil pressure within the chamber 100.

During engine combustion the increased pressure within the combustion chamber of the cylinder is transmitted through the crown 18 to the oil within the chamber 36. The increased oil pressure within the chamber 36 acts upon the valve 74 and snaps it downwardly upon a predetermined pressure being produced to thereby permit oil from the chamber 36 to discharge through the passageways 76 and 78 and into the crankcase lubrication system of the engine. In this way, a predetermined maximum combustion pressure is mantained after the engine has gradually achieved this pressure by gradual extension of the piston assembly.

As more fully described in a patent application entitled Variable Compression Ratio Piston, Ser. No. 611,863 and filed on Sept. 10, 1974 and which is of common ownership with the present application the discharge valve 74 provides a faster dumping of the oil from the chamber 36 then has heretofore been achieved. It also permits the height of the valve assembly 60 and thus of the piston 10 to be substantially reduced thereby saving material costs. Also because of the high area to weight ratio of the valve 74 it permits a more precise control and it is less sensitive to inertia than previously known VCR discharge valves.

Following engine combustion, the piston 10 is driven downwardly in the engine cylinder. As the piston 10 approaches its most retracted position within the engine cylinder, typically within 110° of bottom dead center, the plunger 94 due to inertia moves axially downward within the bore 90 and toward the cap 92. This movement of the plunger 94 pumps the oil entrapped within the chamber 102 through the supply passageways 110 and 65 through the valve assembly 60 and into the chamber 36 thereby separating the outer member 16 from the inner member 12. The increased pressure in the chamber 102 closes the one way valve 104 and prevents oil flow through the passageways 58 and 105.

As more fully described in the aforementioned patent application, the upper chamber 36 is directly connected to the lower chamber 38 by the restricted passageway 40. There is no valve within the pasage so that oil can flow back and forth between the chamber 36 and 38. The restriction of the passage 40, however, limits the rate of fluid flow from the lower chamber 38 to the upper chamber 36. The oil in the lower chamber 38 offsets the inertia force on the outer member 16 and by reason of the restricted connection 40 between the chambers 36 and 38, limits excessive piston travel per stroke.

It can thus be seen that the plunger 94 and its associated components provide a simple, inexpensive and effective means for pumping oil into the chamber 36. The plunger 94 thus provides a means for separating the outer piston member 16 from the inner piston member 12 during each reciprocation of the piston 10 such that the piston 10 is particularly suited for a two cycle internal combustion engine.

It can also be seen that the employment of a high density material for the construction of the piston 94 so as to insure a high mass versus bore diameter enhances the low speed capability of this VCR concept, particularly when high pressure supercharging is utilized.

It can also be seen that at very low engine speeds, such as may be experienced during starting, the oil pressure of the engine would be affected by the chamber 36 by reason of the direct connection between the oil system of the engine and chamber 36 in the absence of the plunger 94.

While it has been preferred to describe the present invention in a VCR assembly which includes an outer member 16 of relatively short axial length so that the lower chamber 38 is quite near the upper chamber 36, the invention can be used as well in an assembly in which the outer member is of substantially the same axial length as the inner member and the lower chamber is disposed quite near the inner end of the piston assembly.

Having thus described our invention many modifications thereto will become apparent to those skilled in the art to which it pertains without deviating from the spirit of the invention as defined by the scope of the appended claims.

We claim:

1. In an internal combustion engine, a piston having an inner member and an outer member telescopically received by said inner member, said members being movable in response to reciprocation of the piston with respect to a combustion chamber of the engine, a fluid chamber varying in volume in response to said relative movement and to variations in the quantity of fluid therein, and means for supplying fluid to said chamber, said means comprising a supply passage in said piston connecting with said fluid chamber, a one way inlet valve disposed in said supply passage, an inertial plunger freely slidably disposed in a substantially axial bore closed at each end and formed in the inner member, wherein said supply passage communicates with the lower portion of said bore, and a further passage connected between the lower portion of said bore and the lubrication system of the engine, said last mentioned passage having a one way valve means disposed within the passage for permitting fluid flow from the last mentioned passage and into the bore, whereby said plunger moves to the upper end of said bore at substantially the top of the stroke of said piston in said cylinder to thereby draw fluid into said bore though said further passage and whereby said plunger moves to the lower end of said bore at substantially the bottom of the stroke of said piston to thereby pump said fluid through said supply passage and to said chamber.

2. The invention as defined in claim 1 wherein said plunger includes a reduced diameter portion at its upper end, said inner member having a passage between the upper end of said bore and one side of said inner member to permit oil leakage past said reduced diameter portion of said plunger and through said last mentioned passage.

3. The invention as defined in claim 2 wherein said plunger closes said last mentioned passage near its uppermost travel to thereby entrap a portion of oil at the upper end of said bore.

4. The invention as defined in claim 1 and including a plug for closing the lower end of said bore.

5. The invention as defined in claim 1 and including a passage connected with said fluid chamber and communicating with the crankcase of said engine, a normally closed valve disposed within said last mentioned passage and operable upon a predetermined pressure in said fluid chamber to open and thereby permit fluid to discharge from said fluid chamber and into said crankcase.

6. The invention as defined in claim 5 and in which said valve is a spring washer.

7. The invention as defined in claim 5 and in which said valve is a Belleville spring washer.

8. The invention as defined in claim 1 and including a plate carried at the upper end of said inner member, said valve in said supply means carried by said plate.

9. In an internal combustion engine, a piston having an inner member and an outer member telescopically received by said inner member, said members being movable in response to reciprocation of the piston with respect to a combustion chamber of the engine, a fluid chamber varying in volume in response to said relative movement and to variations in the quantity of fluid therein, and means for supplying fluid to said chamber, said means comprising a supply passage in said piston connecting with said fluid chamber, a one way inlet valve disposed in said supply passage and a plunger slidably disposed in a bore closed at each end and formed in the inner member wherein said supply passage communicates with the lower portion of said bore and wherein said plunger includes a reduced diameter portion at its upper end, said inner member having a passage between the upper end of said bore and one side of said inner member to permit oil leakage past said reduced diameter portion of said plunger and through said last mentioned passage.

10. The invention as defined in claim 9 and including a passage connected between the base of said bore and the lubrication system of the engine, said last mentioned passage having a one way valve means disposed within the passage for permitting fluid communications from the last said passage into the bore.

11. The invention as defined in claim 9 wherein said plunger closes said last mentioned passage near its uppermost travel to thereby entrap a portion of oil at the upper end of said bore.

* * * * *

UNITED STATES PATENT AND TRADEMARK OFFICE
CERTIFICATE OF CORRECTION

PATENT NO. : 4,079,707

DATED : March 21, 1978

INVENTOR(S) : Albert M. Karaba, Alexander P. Brouwers & Walter P. Isley

It is certified that error appears in the above-identified patent and that said Letters Patent are hereby corrected as shown below:

Col. 2, line 65, delete "slideably" and insert --slidably-- therefor;

Col. 3, line 5, delete "and" (second occurrence);

Col. 3, line 28, after "upper", delete "chambers" and insert --chamber-- therefor;

Col. 3, line 50, delete "56" and insert --36-- therefor;

Col. 3, line 53, delete "of" and insert --or-- therefor;

Col. 4, line 67, after "1974", add --, now U.S. Patent No. 4,016,841,--;

Col. 5, line 26, delete "pasage" and insert --passage-- therefor;

Col. 6, line 23, delete "though" and insert --through-- therefor;

Signed and Sealed this

Twenty-second Day of August 1978

[SEAL]

Attest:

RUTH C. MASON
Attesting Officer

DONALD W. BANNER
Commissioner of Patents and Trademarks